US007881280B2

(12) United States Patent
Pennock et al.

(10) Patent No.: US 7,881,280 B2
(45) Date of Patent: Feb. 1, 2011

(54) METHOD AND APPARATUS TO FACILITATE A NON-FULLY MESHED COMMUNICATIONS SYSTEM GATEWAY INTERFACE

(75) Inventors: Leonard Pennock, Chandler, AZ (US); Thomas G. Hallin, Erie, CO (US); William N. Shores, Phoneix, AZ (US)

(73) Assignee: Motorola Mobilty, Inc., Libertyville, IL (US)

( * ) Notice: Subject to any disclaimer, the term of this patent is extended or adjusted under 35 U.S.C. 154(b) by 1155 days.

(21) Appl. No.: 11/026,985

(22) Filed: Dec. 30, 2004

(65) Prior Publication Data

US 2006/0146841 A1 Jul. 6, 2006

(51) Int. Cl.
*H04L 12/28* (2006.01)

(52) U.S. Cl. .................. 370/351; 370/392; 370/400; 370/401

(58) Field of Classification Search .................. 370/230, 370/351, 352, 338, 349, 235, 236, 252, 394, 370/395, 395.62, 400, 401, 508, 517, 519, 370/353, 354, 355, 356, 357, 392; 709/227, 709/228, 229, 237, 238; 379/90.01, 900
See application file for complete search history.

(56) References Cited

U.S. PATENT DOCUMENTS

| | | | | | |
|---|---|---|---|---|---|
| 5,422,878 | A | * | 6/1995 | Kimoto et al. | 370/401 |
| 5,757,903 | A | * | 5/1998 | Welter, Jr. | 379/229 |
| 6,134,316 | A | * | 10/2000 | Kallioniemi et al. | 379/220.01 |
| 6,442,258 | B1 | * | 8/2002 | Mashinsky | 379/114.02 |
| 6,647,113 | B2 | * | 11/2003 | McCann et al. | 379/221.13 |
| 6,751,218 | B1 | * | 6/2004 | Hagirahim et al. | 370/390 |
| 6,801,523 | B1 | * | 10/2004 | Osman | 370/352 |
| 6,819,664 | B1 | * | 11/2004 | Jeong | 370/352 |
| 6,957,262 | B2 | * | 10/2005 | Kimura et al. | 709/227 |
| 2001/0035993 | A1 | * | 11/2001 | Condict et al. | 359/124 |
| 2002/0080778 | A1 | * | 6/2002 | Matsugatani et al. | 370/352 |
| 2002/0093916 | A1 | * | 7/2002 | Vencour | 370/238 |
| 2002/0160753 | A1 | * | 10/2002 | Campana et al. | 455/412 |
| 2003/0058818 | A1 | * | 3/2003 | Wilkes et al. | 370/331 |
| 2003/0158967 | A1 | * | 8/2003 | Tripathi et al. | 709/245 |
| 2004/0081206 | A1 | * | 4/2004 | Allison et al. | 370/522 |
| 2004/0136517 | A1 | * | 7/2004 | Bjornberg et al. | 379/220.01 |
| 2004/0203558 | A1 | * | 10/2004 | Suzuki et al. | 455/403 |
| 2005/0021713 | A1 | * | 1/2005 | Dugan et al. | 709/223 |
| 2005/0111445 | A1 | * | 5/2005 | Wybenga et al. | 370/389 |
| 2005/0190750 | A1 | * | 9/2005 | Kafka et al. | 370/352 |
| 2005/0268043 | A1 | * | 12/2005 | Kitamura | 711/131 |
| 2006/0067344 | A1 | * | 3/2006 | Sakurai | 370/401 |
| 2006/0067485 | A1 | * | 3/2006 | Beason et al. | 379/45 |
| 2006/0274732 | A1 | * | 12/2006 | Allen et al. | 370/352 |
| 2007/0230340 | A1 | * | 10/2007 | Serbest et al. | 370/230 |
| 2008/0279178 | A1 | * | 11/2008 | Chou et al. | 370/352 |

* cited by examiner

*Primary Examiner*—Aung S Moe
*Assistant Examiner*—Abdullah Riyami

(57) ABSTRACT

One or more gateways (107 and 108) as serve to interconnect the discrete call facilitation platforms (403 and 404) of a given communication network with an external communication network (109) as provided with the routing addresses of such discrete call facilitation platforms. The discrete call facilitation platforms, however, are not provisioned in a reciprocal fashion. Instead, the discrete call facilitation platforms are only provided with a subset of available gateway addresses. In a preferred approach, this is accompanied by less-than-fully-meshed connectivity between the gateways and the discrete call facilitation platforms.

10 Claims, 4 Drawing Sheets

METHOD AND APPARATUS TO FACILITATE A NON-FULLY MESHED COMMUNICATIONS SYSTEM GATEWAY INTERFACE

TECHNICAL FIELD

This invention relates generally to communication systems architecture and more particularly to inter-network gateways.

BACKGROUND

Modern communications systems are often comprised of a significant number of call facilitation platforms such as, but certainly not limited to, call signaling servers, location servers, and bearer functions. In many cases such network elements are deployed to provide call facilitation support for a corresponding geographic service area. Such call facilitation platforms typically each have at least one corresponding routing address whereby others within and without the system can identify and contact that call facilitation platform. In a fully meshed network architecture, each such call facilitation platform is essentially linked to every other geographic service area within the system. Such linkage permits and facilitates the correct routing of calls.

In many cases it becomes desirable or even necessary to operably couple a first communication network to another communication network. Such linkage can serve, for example, to permit an end-user in the first communication network to communicate with an end-user in the other communication network. In many cases, however, such networks differ from one another in significant ways. Gateways are therefore often employed to bridge networks in order to compatibly effect such inter-network communications.

In many cases, such a gateway presents itself to the elements of a given network as another of-kind network element. Accordingly, for example, when a given communication network comprises discrete call facilitation platforms such as call signaling servers, location servers, and bearer functions, a gateway will present itself to that network as itself comprising one or more of-kind call signaling servers, location servers, and/or bearer functions.

When two networks can be effectively bridged by only a single such gateway, it usually would present no significant issue to fully mesh the elements of that gateway with the other call facilitation platforms as comprise such networks. In many cases, however, one gateway will not suffice. Instead, two or (more typically) many more such gateways must be provided in order to assure adequate quality of service. It would be conceptually possible, of course, to fully mesh the elements of each such gateway with the call facilitation platforms as service the various geographic service areas of a given network, but such an approach in practice can be both burdensome and expensive.

In some cases, such problems can ultimately present a serious barrier to upward scaling of network size and expansion. For example, in some cases the number of physical and/or logical connections that a given call signaling server can support has an upper limit. When the number of necessary gateways (coupled with other necessary connections) exceeds the available number of supportable connections, a fully meshed deployment becomes impossible.

BRIEF DESCRIPTION OF THE DRAWINGS

The above needs are at least partially met through provision of the method and apparatus to facilitate a non-fully meshed communication system gateway interface described in the following detailed description, particularly when studied in conjunction with the drawings, wherein.

Figure 1:
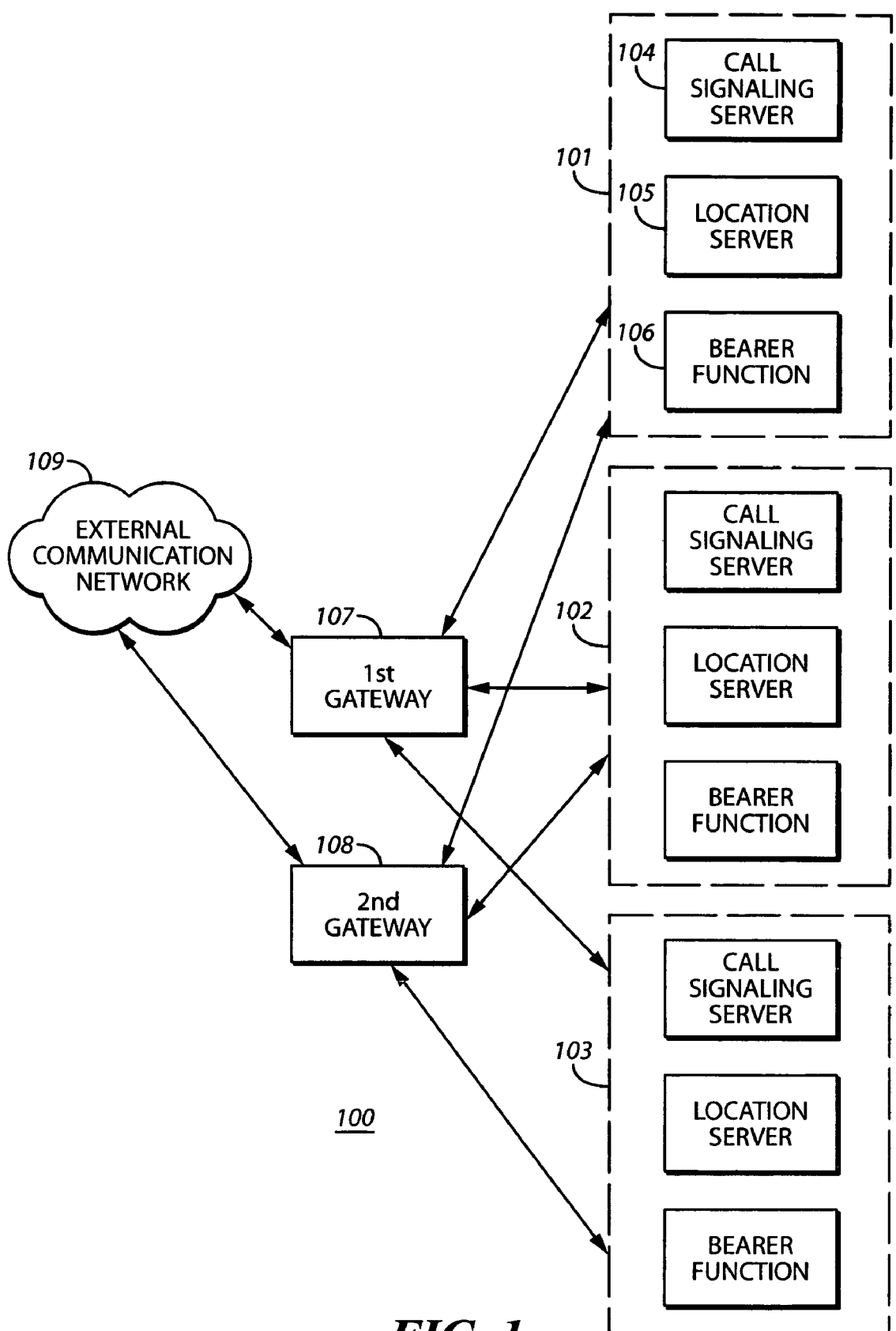
FIG. 1 comprises a block diagram prior art depiction of a fully meshed gateway deployment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, at least one discrete call facilitation platform is provided for each of a plurality of geographic service areas of a communication network. Each such discrete call facilitation platform has at least one corresponding routing address and can support at least one corresponding end-user station. A plurality of gateways are also provided to interface these discrete call facilitation platforms to another communication network. Each such gateway also has at least one corresponding routing address (and, in a typical embodiment, likely encompasses a plurality of routing addresses).

Routing addresses as correspond to each of the discrete call facilitation platforms are then provided to at least some of the gateways such that at least one of the gateways can identify call routing via any of the discrete call facilitation platforms (even though, in a typical embodiment, such a gateway might not employ such information to directly route such a call via such a discrete call facilitation platform). In addition, at least one routing address as corresponds to at least one of the gateways is provided to each of the discrete call facilitation platforms while denying at least one of the discrete call facilitation platforms of information regarding routing addresses for at least one of the plurality of gateways. Accordingly, the discrete call facilitation platforms do not all share a common view of available gateway routing addresses.

So configured, full meshing between each such discrete call facilitation platform and each gateway is neither supported nor necessary. Instead, outbound calls (i.e., calls to an external network) are readily managed as each call facilitation platform has ready access (via the provided gateway routing addresses) to at least one gateway (notwithstanding that such call facilitation platforms do not have access to all of the gateways because these platforms lack the requisite routing address information for all of the gateways). Furthermore, inbound calls are readily managed, even when an inbound call may initially be directed via an inappropriate gateway, as the gateways are each provided with sufficient routing information for all of the geographic service areas as comprise the network and hence are able to respond to such calls with accurate redirection routing information.

By avoiding a need for full meshing, the above noted obstacles to upward scaling of network size are effectively mitigated. Instead, legacy equipment as comprises a given network can be readily coupled via as many gateways as may be necessary to such external communications networks as may be desired notwithstanding limitations regarding the number of connections that such equipment may be able to support.

These and other benefits may become clearer upon making a thorough review and study of the following detailed description. Referring now to the drawings, and in particular to FIG. 1, it may be helpful to first briefly describe and characterize a fully meshed multi-gateway configuration. In this illustrative example, a communication network 100 provides service to a plurality of geographic service areas 101, 102, and 103 (in the illustration provided these geographic service areas appear to be distinct from one another, but those skilled in the art will recognize that some degree of overlap between at least some geographic service areas is typical and to be expected). In this particular example, each geographic service area receives support from at least one each of a call signaling server 104, a location server 105, and a bearer function 106. For example, in the case of an iDEN® wireless communication network, the call signaling server 104 would comprise a Dispatch Application Process (DAP), the location server 105 would comprise an iDEN Home Location Register (iHLR), and the bearer function 106 would comprise an iDEN Dispatch Audio Controller (iDAC).

Those skilled in the art will recognize that, in many cases, a given geographic service area will in fact receive support from additional discrete call facilitation platforms. For example, in many cases, a given geographic service area will receive support from a plurality of call signaling servers. FIG. 1 depicts only one of each such platform for each geographic service area, however, for the sake of clarity.

In a typical deployment, each such call facilitation platform has a corresponding routing address. These addresses serve to identify each such platform and facilitate the forwarding of various messages and signals within the network 100. The nature and defining characteristics of such routing addresses may vary from network to network and these teachings are not overly sensitive to one approach or another in this regard. Further, since the make-up and use of such routing addresses comprises a well-understood area of endeavor, further elaboration regarding such routing addresses will not be provided here for the sake of clarity and the preservation of narrative focus.

Those skilled in the art will also recognize that, in a typical network, information regarding these routing addresses will be widely distributed within such a network. Accordingly, for the most part, such discrete call facilitation platforms will be relatively well informed regarding the existence of the other platforms and their respective routing addresses. Such meshing, however, is not depicted in FIG. 1 for the sake of simplicity and clarity.

The depicted embodiment also comprises two gateways 107 and 108 that serve to interface the discrete call facilitation platforms of the communication network 100 to an external communication network 109. For example, in the case where the communication network 100 comprises an iDEN® network, the external communication network 109 might comprise a so-called 3G cellular telephony communication network. In this deployment, these two gateways 107 and 108 are each fully meshed with respect to the various geographic service areas serviced by the communication network 100. That is, each gateway directly couples to at least one (and typically to all) of the discrete call facilitation platforms as service each such geographic service areas.

Those skilled in the art will recognize that such gateways will typically themselves comprise a plurality of constituent capabilities that often comprise, or at least mimic, the capabilities of one or more respective call facilitation platforms. For example, in the illustrative example of FIG. 1, each gateway would typically present at least one call signaling server, one location server, and one bearer function to the communication network 100, wherein each such constituent capability will also have at least one corresponding routing address. In such a case, such gateway elements will typically not all share a common routing address but will instead each have a network-unique routing address. Accordingly, not untypically, a given gateway will itself usually make use of a plurality of routing addresses.

Such a configuration will, in fact, likely serve the intended purpose of effecting viable communications as between these two networks 100 and 109. As noted above, however, such a configuration, being based upon an extension of a fully-meshed architecture, can quickly outstrip the connection capacity of at least some of the call facilitation platforms as the number of gateways increases. This, in turn, can ultimately cause such an approach to be at least unwieldy and expensive and, at worst, unviable and ineffective.

Figure 2:
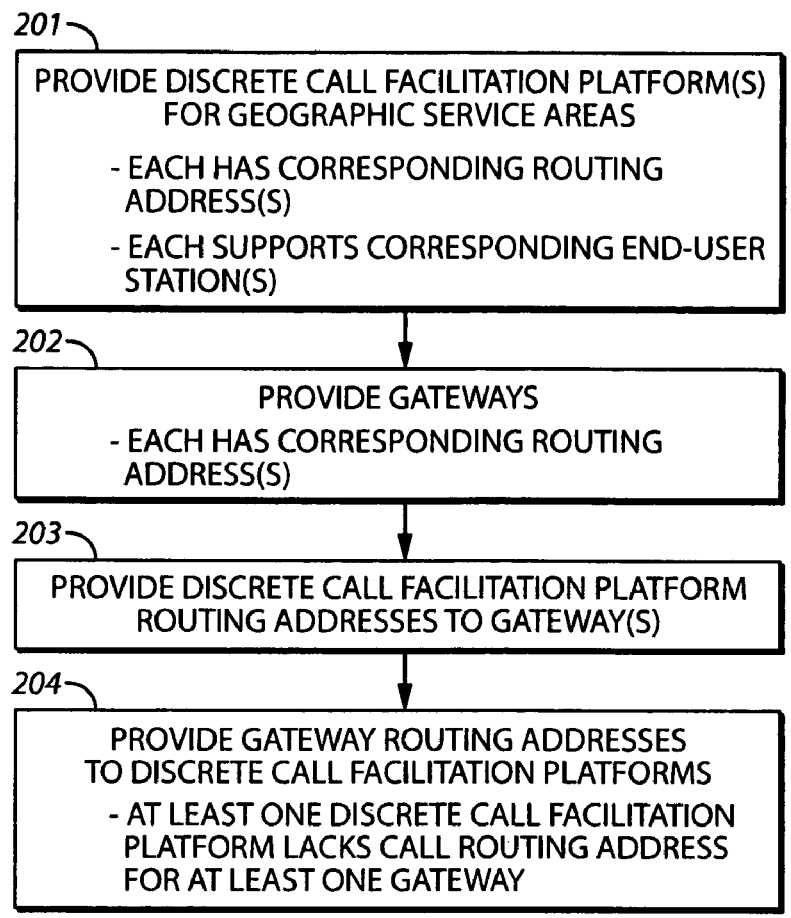
FIG. 2 comprises a flow diagram as configured in accordance with various embodiments of the invention.

Referring now to FIG. 2, an overall process 200 that at least mitigates the impact of such problems comprises providing 201, for each of a plurality of geographic service areas of a communication network, at least one discrete call facilitation platform wherein each discrete call facilitation platform has at least one corresponding routing address and typically serves to support at least one corresponding end-user station. The precise nature of these discrete call facilitation platforms can vary with the needs and requirements of a given application but certainly may comprise, as already described above, any of a call signaling server, a location server, and/or a bearer function.

This process 200 also accommodates the provision 202 of a plurality of gateways to interface the discrete call facilitation platforms to another communication network. In a preferred approach each such gateway has at least one corresponding routing address and, more typically, will likely have a plurality of corresponding routing addresses to accommodate, for example, various discrete capabilities. For example, a given individual gateway may comprise one or more voice signaling gateways each having a corresponding routing address, one or more interrogation gateways or location servers each having a corresponding routing address, and/or one or more bearer function gateways each having a corresponding routing address, wherein each such routing address comprises a different routing address.

This process 200 then effects the provision 203 of routing addresses as correspond to each of the discrete call facilitation platforms to at least some of the plurality of gateways, such that at least one of the plurality of gateways (or, more preferably, all of the plurality of gateways) is able to specifically address a communication via any of the discrete call facilitation platforms. Notwithstanding such provisioning, however, it should be understood that in a preferred approach each such gateway will not typically serve to effect direct communications via such platforms in all cases. Instead, and owing in part to the intent of these teachings to permit a less-than-fully-meshed architecture, a given gateway can instead often make use of this routing address information to provide helpful redirection messages to thereby facilitate inbound communication needs. (Additional information regarding such redirection techniques can be found, for example, in a co-pending U.S. patent application Ser. No. 11/026,959 and entitled PEER NETWORK INTERACTION FACILITATION METHOD).

Lastly, this process 200 also provides 204 at least one routing address as corresponds to at least one of the plurality of gateways to each of the discrete call facilitation platforms while denying at least one of the discrete call facilitation platforms of information regarding routing addresses for at least one of the plurality of gateways. As a result, many of the discrete call facilitation platforms will each harbor differing gateway routing information and hence will not share a common view of available gateway routing addresses.

For example, if desired, each of the discrete call facilitation platforms may only be provided with information regarding routing addresses as correspond to only a single one of the plurality of gateways. In such a case, it may be preferred to provision the call facilitation platforms in such a way that all of the call facilitation platforms as provide services to a common geographic service area each receives a routing address for the one gateway that is in fact connected to the call facilitation platforms for that geographic service area. (And again, it should be recalled that in such a case the gateway routing addresses as are provided to the call facilitation platforms may differ from one another because the gateway itself may make use of a plurality of differing routing addresses.)

So configured, it becomes possible to match a less-than-fully-meshed configuration with the provisioning of routing addresses. More particularly, the call facilitation platforms as serve a given geographic service area will preferably only connect to, and only have routing information as pertains to, a single gateway. At the same time, at least some of the gateways, and preferably all of the gateways, will each have routing address information for all of the call facilitation platforms. Though the latter information may not always be directly applied by the gateways when facilitating a call (owing to the lack of meshed connectivity between each gateway and each call facilitation platform), it can be readily applied to effect accurate call redirection messages to facilitate such communications.

Figure 3:
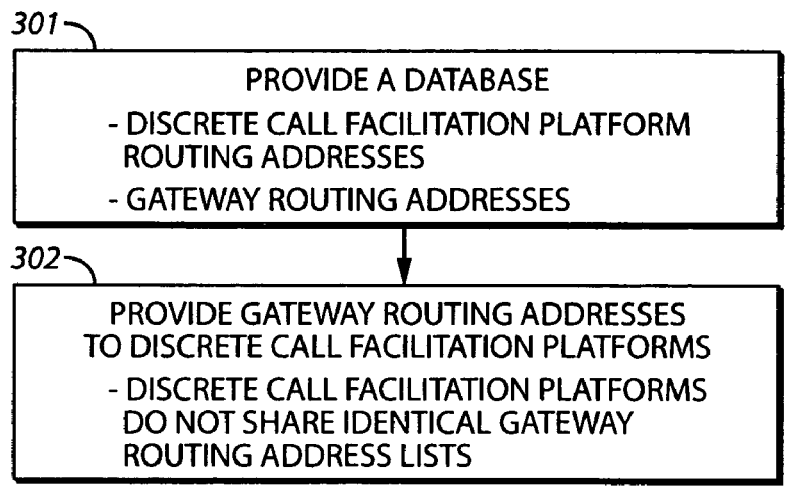
FIG. 3 comprises a flow diagram as configured in accordance with various embodiments of the invention.

There are various ways to effect such a process 200. With reference to FIG. 3, in a preferred approach, one provides 301 a database that contains platform routing addresses for each of the discrete call facilitation platforms and gateway routing addresses for each of the plurality of gateways. This database can then be accessed as needed to provide 302 such routing address information as described above. In particular, routing addresses for at least one of the gateways, but not all of the gateways, can be provided to each of the plurality of discrete call facilitation platforms such that at least some of the discrete call facilitation platforms do not share an identical list of gateway routing addresses with one another though each of the discrete call facilitation platforms can directly route a communication via at least one corresponding gateway via at least one provided gateway routing address. In a preferred approach each such call facilitation platform receives the set of gateway routing addresses for only one of the plurality of gateways, thereby permitting a highly unmeshed configuration.

Figure 4:
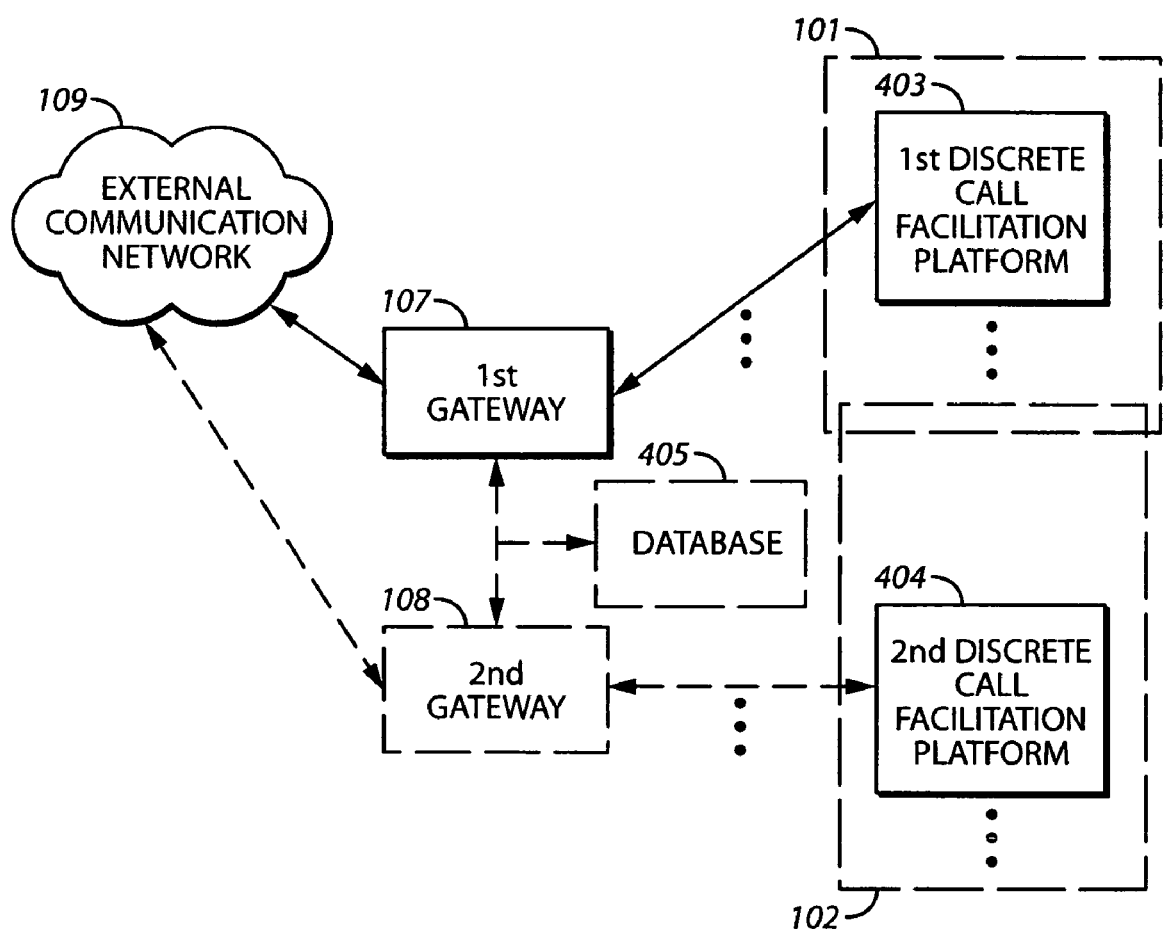
FIG. 4 comprises a block diagram as configured in accordance with various embodiments of the invention.

Referring now to FIG. 4, these teachings permit the deployment of multiple gateways in a less-than-fully-meshed configuration. In particular, and to illustrate these points, a first gateway 107 is coupled to a first discrete call facilitation platform 403 as serves a first geographic service area 101. (In a preferred approach, all other discrete call facilitation platforms as also service that same geographic service area are also similarly coupled to this first gateway 107.) This first discrete call facilitation platform 403 is provisioned with at least one routing address for the first gateway 107. Similarly, the first gateway 107 has the routing address for the first discrete call facilitation platform 403. Accordingly, either element can make direct contact with the other.

A second discrete call facilitation platform 404 as serves a second geographic service area 102, however, is not so coupled to the first gateway 107. Moreover, this second discrete call facilitation platform 404 is not provisioned with the routing address for the first gateway 107 although, in a preferred approach, the first gateway 107 does have access to the routing address for the second discrete call facilitation platform 404. So configured, the second discrete call facilitation platform is neither coupled to the first gateway 107 nor otherwise effectively aware thereof. The first gateway 107, on the other hand, is aware of the second discrete call facilitation platform and has the requisite corresponding routing address information to inform redirection messages to effect the facilitation of calls via the second discrete call facilitation platform.

In a preferred, though optional, embodiment, a second gateway 108 couples to the second discrete call facilitation platform 404. In such a case, the second discrete call facilitation platform 404 is provisioned with the routing address (or addresses) of the second gateway 108 and vice versa such that these elements are then capable of direct interaction. Also in a preferred approach the second gateway 108 has the routing address for the first discrete call facilitation platform 403 (and other platforms as serve the first geographic service area 101 for that matter) and is therefore also able to redirect calls to the first geographic service area 101 notwithstanding that there is no direct connection between the former and the latter.

As noted above, a database 405 containing such routing addresses can be provided if desired as a way of implementing these teachings. Those skilled in the art, however, will recognize that other provisioning platforms might also be employed to useful effect if desired.

So configured, and consistent with these teachings, such a configuration serves to provide some, but not all, of the routing addresses as may be stored in the database (or elsewhere) to the first and second discrete call facilitation platforms 403 and 404 and in particular not providing all of the gateway routing addresses to each of the first and second discrete call facilitation platforms 403 and 404.

Figure 5:
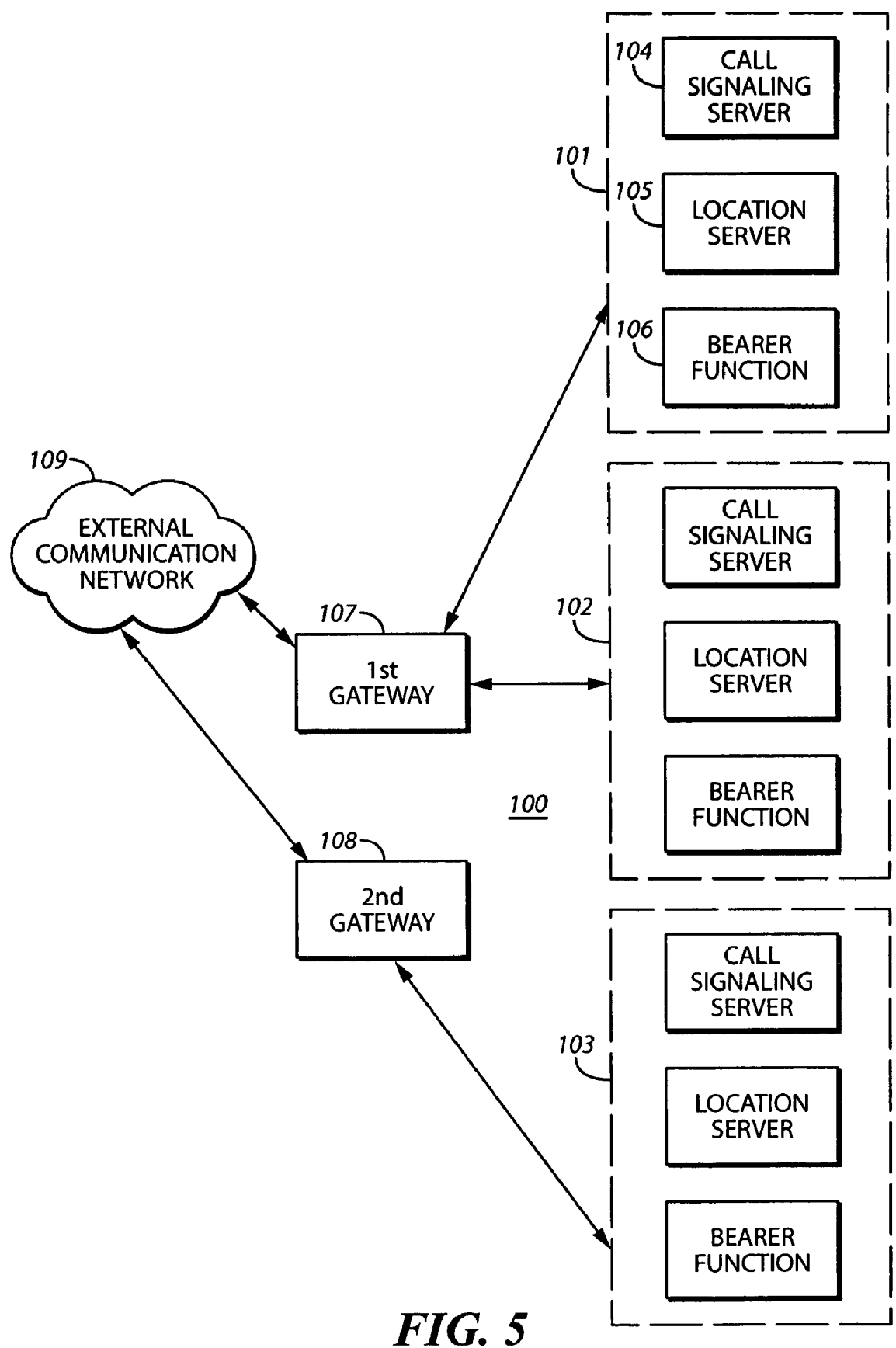
FIG. 5 comprises a block diagram depiction of a less than fully meshed gateway deployment as configured in accordance with various embodiments of the invention.

Turning now to FIG. 5, it can be readily seen and understood that deploying a plurality of gateways in conjunction with these teachings permits a less-than-fully-meshed set of connections as between the gateways 107 and 108 and the discrete call facilitation platforms 104, 105, and 106 as serve a plurality of geographic service areas 101, 102, and 103. Although a given gateway (such as the first gateway 107) may serve more than one geographic service area (such as the geographic service areas denoted by reference numerals 101 and 102), and hence the discrete call facilitation platforms as serve those multiple geographic service areas 101 and 102 may be informed of one or more routing addresses for that gateway, not all of the call facilitation platforms are so informed. For example, in the illustrative example provided, the discrete call facilitation platforms of a third geographic service area 103 are not meshed with the first gateway 107 and further lack routing address information for that first gateway 107.

At the same time, however, the first and second gateways 107 and 108 do have access to routing address information for all of the discrete call facilitation platforms as serve the various geographic service areas, regardless of whether the gateway itself is otherwise meshed with such geographic service areas. This, in turn, permits each such gateway to effectively redirect, for example, external calls to an appropriate other gateway and geographic service area when the gateway is not itself able to directly support the call.

These teachings are therefore seen to facilitate the provision of a less-than-fully-meshed multi-gateway architectural deployment. This, in turn, facilitates upward scaling and network growth essentially without limit as might otherwise be introduced by fully-meshed connectivity requirements.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
providing, for each of a plurality of geographic service areas of a communication network, at least one discrete call facilitation platform wherein each discrete call facilitation platform has at least one corresponding routing address and supports at least one corresponding end-user station;
providing a plurality of gateways to interface the discrete call facilitation platforms to another communication network wherein each of the plurality of gateways has at least one corresponding routing address;
providing routing addresses as correspond to each of the discrete call facilitation platforms to at least some of the plurality of gateways, such that at least one of the plurality of gateways is able to specifically address a communication via any of the discrete call facilitation platforms;
providing at least one routing address as corresponds to at least one of the plurality of gateways to each of the discrete call facilitation platforms while denying at least one of the discrete call facilitation platforms of information regarding routing addresses for at least one of the plurality of gateways comprises providing varying ones of the discrete call facilitation platforms with differing gateway routing addresses from the database;
providing a database containing all of the routing addresses for the plurality of gateways and all of the discrete call facilitation platforms;
such that all of the discrete call facilitation platforms do not share a common view of available gateway routing addresses.

2. The method of claim 1 wherein providing, for each of the plurality of geographic service areas of a communication network, at least one discrete call facilitation platform wherein each discrete call facilitation platform has at least one corresponding routing address further comprises providing a discrete call facilitation platform comprising at least one of:
a call signaling server having a corresponding routing address;
a location server having a corresponding routing address;
a bearer function having a corresponding routing address.

3. The method of claim 1 wherein providing the plurality of gateways further comprises providing a plurality of voice signaling gateways.

4. The method of claim 3 wherein providing the plurality of voice signaling gateways further comprises providing a plurality of voice signaling gateways that each includes a call signaling server having a corresponding routing address.

5. The method of claim 1 wherein providing the plurality of gateways further comprises providing a plurality of interrogation gateways.

6. The method of claim 1 wherein providing the plurality of gateways further comprises providing a plurality of bearer function gateways.

7. The method of claim 1 wherein at least one of the plurality of gateways comprises at least one voice signaling gateway, at least one interrogation gateway, and at least one bearer function gateway, which each having a different corresponding routing address.

8. The method of claim 1 wherein providing the at least one routing address as corresponds to at least one of the plurality of gateways to each of the discrete call facilitation platforms while denying at least one of the discrete call facilitation platforms of information regarding routing addresses for one of the plurality of gateways further comprises providing each of the discrete call facilitation platforms only with information regarding routing addresses as correspond to a single one of the plurality of gateways.

9. The method of claim 8 wherein providing the at least one routing address as corresponds to at least one of the plurality of gateways to each of the discrete call facilitation platforms further comprises only providing gateway routing addresses as correspond to only one of the plurality of gateways to each of the discrete call facilitation platforms as are provided for a given one of the plurality of geographic service areas.

10. The method of claim 1 wherein providing varying ones of the discrete call facilitation platforms with differing gateway routing addresses from the database further comprises providing each of the discrete call facilitation platforms only with routing addresses as correspond to a gateway that serves the geographic service area as corresponds to each such discrete call facilitation platform.

* * * * *